United States Patent Office 3,148,161
Patented Sept. 8, 1964

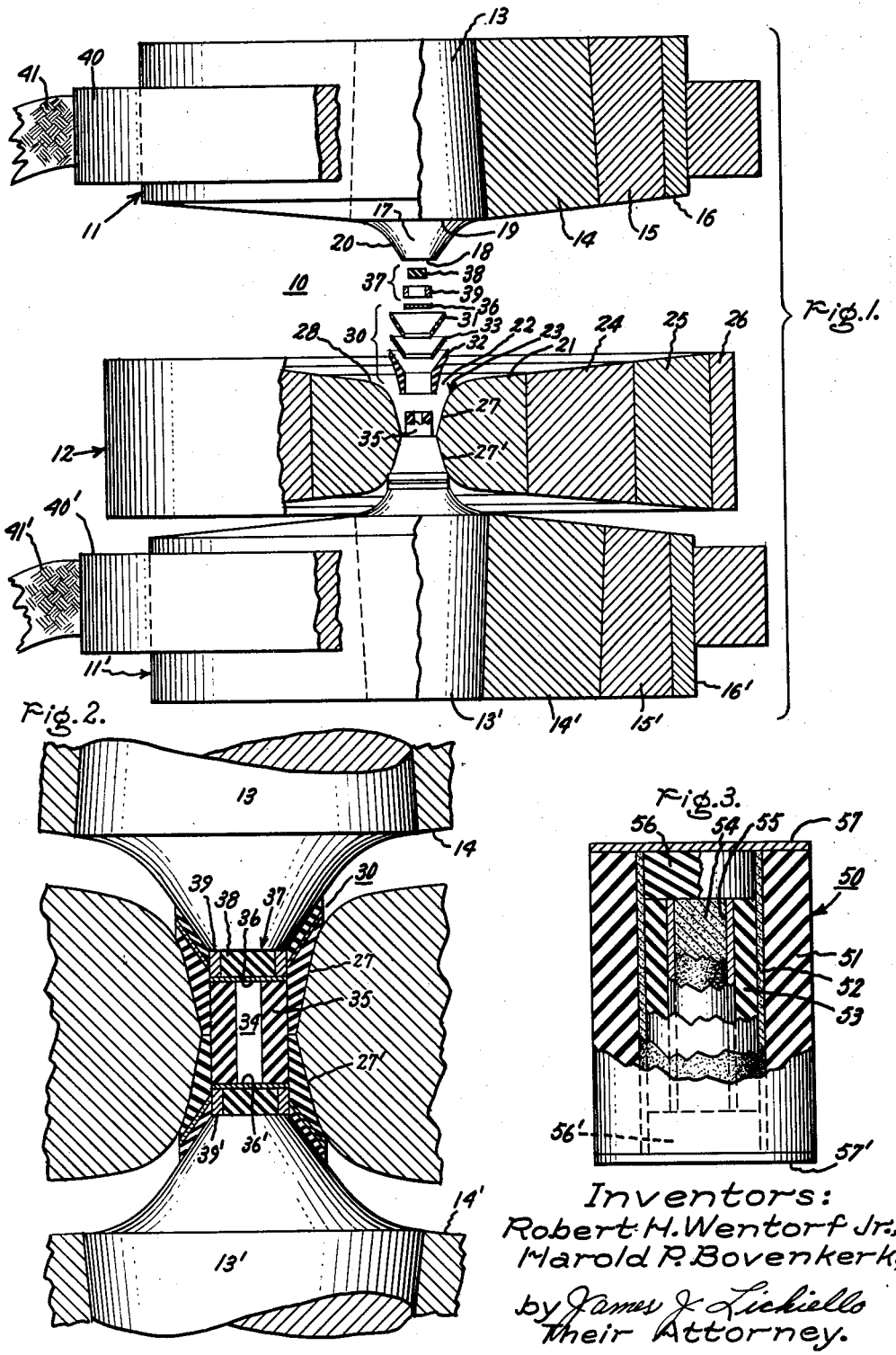

3,148,161
METHOD FOR THE INTRODUCTION OF BORON ATOMS INTO DIAMOND CRYSTALS
Robert H. Wentorf, Jr., Schenectady, N.Y., and Harold P. Bovenkerk, Royal Oak, Mich., assignors to General Electric Company, a corporation of New York
Filed Aug. 9, 1961, Ser. No. 130,439
5 Claims. (Cl. 252—502)

This invention relates to electrically conductive man-produced diamonds and to a method of producing electrically conductive diamonds in a diamond growing process and is a continuation-in-part application of copending application Serial No. 36,595, filed June 16, 1960, and now abandoned, and assigned to the same assignee as the present invention.

The term "electrically conductive diamond" refers to a diamond crystal capable of conducting electrical current by means of mobile electrons similar to the conduction of electrical current through metals. The term is intended to exclude the conduction of electricity in a diamond crystal by connected inclusions therein of foreign materials such as metals, where conduction is through the inclusion only. Semiconduction, however, is a term to be included with respect to diamonds of this invention.

Although diamond and graphite are two allotropic forms of the same element, carbon, they are separate in having different electrical properties. While carbon is classified as electrically conductive, diamond is generally considered to be an insulator rather than electrically conductive, although, when heated to a very high temperature, some natural diamonds may become somewhat conductive. Some natural diamonds have been found which are electrically conductive, but it appears that their electrically conductive properties are generally dependent on foreign inclusions therein and that these diamonds are conducting electricity through the inclusions alone. Natural diamonds have also been found which are electrically conductive, without conducting through inclusions, and of a characteristic blue color, but their relative scarcity and unpredictable characteristics have relegated them to objects of study and curiosity rather than to any widespread commercially usable and finite applications.

Because of a diamond's high strength characteristics and its resistance to high temperature, it is desirable both as a conducting and a semiconducting material. A semiconducting diamond is particularly desirable because of its inherent strength, durability and, more importantly, its relative freedom from high temperature effects which are injurious to such semiconducting materials as silicon and germanium.

Accordingly, it is an object of this invention to provide a man-produced electrically conductive diamond.

It is another object of this invention to provide a man-produced electrically conductive diamond which conducts electricity electronically.

It is yet another object of this invention to provide a man-produced electrically conductive diamond for semiconductor applications.

It is still another object of this invention to provide man-produced electrically conductive diamonds which are made electrically conductive in a diamond growth process.

It is another object of this invention to provide a semiconductive diamond.

It is another object of this invention to provide a man-produced electrically conductive diamond of a blue color.

It is another object of this invention to provide a method of changing the coloring of diamond in a growth process.

Briefly described, this invention in one form includes adding a quantity of an activator material to a carbonaceous material-catalyst combination in a diamond growth process which produces an electrically conductive diamond crystal. The term "carbonaceous material" is intended to describe any material which will serve as a source of elemental or free non-diamond carbon under the conditions of pressure and temperature employed to effect the transformation of graphite-to-diamond by any method.

This invention will be better understood when taken in connection with the following description and drawing, in which FIG. 1 is an illustration of a high pressure high temperature apparatus;

FIG. 2 is an enlargement and assembled view of the center portion of FIG. 1 illustrating a reaction vessel and gasket assembly; and FIG. 3 is an illustration of a modified form of reaction vessel which is indirectly heated.

Many attempts have been made to make a natural diamond electrically conductive with various processes, well known in the semiconductor art, by which atoms of an activator material, for example, gallium or indium, are caused to proceed into another or host material, for example, germanium, when in the presence of each other at high temperatures. These processes are hereafter generically referred to as "doping" to be inclusive of, for example, radiation, impregnating, diffusing, injection, etc. However, not all materials are satisfactory for this process since the transfer of atoms depends upon such features as, different energy levels of electrons, size and spacing of atoms, etc. These prior processes, with the exception of radiation, as applied to natural diamonds have not provided any positive results. For example, attempts to dope a natural diamond in the usual manner by diffusion or impregnation with such elements as boron, aluminum, and nitrogen, did not indicate any transferring of atoms of these materials into the diamond crystal, since no changes in characteristics were observed.

It has been discovered, however, that diamond may be made electrically conductive if a doping process is applied, in a sense, in a diamond growing process during the transformation or growth of diamond. One diamond growth process includes subjecting a carbonaceous material and a metal catalyst to very high temperatures and pressures. This, however, requires an apparatus capable of sustaining high pressures and high temperatures together with knowledge of a method of making diamonds. The prior art contains several high pressure apparatuses which will sustain these pressures and temperatures. One apparatus has been adequately disclosed and claimed in U.S. Patent 2,941,248, Hall. A method of converting a carbonaceous material to diamond has also been adequately described and claimed in U.S. Patent 2,947,610, Hall et al. By reference, therefore, the disclosures of the aforementioned patents are incorporated herewith.

Referring now to FIG. 1, there is illustrated one preferred embodiment of a high pressure high temperature apparatus 10. Apparatus 10 includes a pair of punch assemblies 11 and 11' together with a lateral pressure resisting assembly or belt member 12. Since the punch assemblies 11 and 11' are similar in nature a description of one suffices for the other. Punch assembly 11 includes a central punch 13 of a hard material, such as tool steel, cemented tungsten carbide, etc., which is prestressed by being surrounded by a plurality of press or shrink fitted hard steel binding rings 14 and 15, and a soft steel guard ring 16. Obviously, the number, size, material and fit of the rings and punch may be varied considerably from the dimensions given, due consideration always being given to the forces and pressures to be withstood. Punch 13 has a generally narrowing tapered portion 17, the taper of which is a smooth diametrical increase from the pressure area or surface 18 axially along the length of the punch to a given larger area 19. Tapered portion 17 includes an end portion 20 of frustoconical configuration with, for example, an angle of about 30° to the vertical. The term "punch" is deemed generic to pressure resisting members, for example, anvils, dies, pistons, etc.

Punch assemblies 11 and 11' are employed in conjunction with a lateral pressure resisting member or die assembly 12, comprising a die 21 having a central opening or aperture 22 therein defined by a tapered or curved wall surface 23. Wall surface 23 generally describes a narrowing tapered or convergent die chamber or opening into which punches 13 and 13' may move or progress to compress a specimen or material, for example, a reaction vessel as illustrated in FIG. 2.

In order to minimize failures, die 21 is also made of a high strength material, such as Carboloy (cemented tungsten carbide) similar to that of punch 13. Prestressing of die 21 may be achieved in the same manner as prestressing of punch 13, and binding rings 24, 25 and 26 are employed for purposes similar to rings 14, 15 and 16 as described. In the embodiment illustrated in FIG. 1, tapered wall 23 includes a pair of frustoconical sections 27 and 27' meeting at a horizontal center line of die 21 and having an angle at about 11° to the vertical. In order to provide motion or stroke for punches 13 and 13' to permit these punches or one of them to move into the chamber 22 to compress a reaction vessel or specimen therein, a gasket is employed between the opposed tapered surfaces of the die 23 and punch 13.

FIG. 1 provides an exploded view of a sandwich type frustoconical gasket assembly 30 which surrounds tapered surface 17 of punch 13. Gasket assembly 30 includes a pair of thermally and electrically insulating pressure resistant frustoconical ceramic or stone material gaskets 31 and 32, and an intermediate metallic gasket 33. Metallic gasket 33 is of, for example, mild steel and employed to impart cohesiveness, tensile strength and ductility to the gasket structure as a whole. Only one gasket, for example, 32 may be employed. Although specific configuration and composition of gasket assembly 30 has been described, it is obvious that any suitable gasket meeting the requirements described may be employed. A gasket may be initially placed between the punches and the die, or, alternatively may be provided by extrusion of the contents of the reaction chamber especially where the contents include a sample holder of good gasket material which extrudes into position.

One form of reaction vessel 34 is illustrated in FIG. 2. Referring now to FIG. 2, reaction vessel 34, approximately 0.750 inch in diameter and 0.930 inch in length is positioned in chamber 22 between punches 13 and 13'. Vessel 34 includes a cylinder 35 of electrically insulating material such as pyrophyllite or catlinite, talc, etc., positioned between a pair of spaced electrically conductive discs 36 and 36'. A washer assembly 37 is positioned between each punch 13 and 13' and its associated discs 36 and comprises a heat insulating core 38 with a surrounding outer electrical conductive ring 39 in contact with punches 13 and 13', to complete the reaction vessel. Rings 39 and 39' are preferably of a hard steel and together with cores 38 provide a cap assembly for reaction vessel 34 which thermally insulates the centers of the punch faces and provides a current path to the material in reaction vessel 34. The punch and die assembly of FIGS. 1 and 2 is positioned between platens or pistons of any suitable press apparatus to provide motion of one or both punches.

Each punch assembly is provided with an electrical connection (FIG. 1) in the form of an annular conducting ring 40 or 40' with connectors 41 and 41', to supply electric current from a source of electrical power (not shown) through punch assemblies 11 and 11', to a high temperature high pressure reaction vessel 34. Pressure is applied to the vessel 34 by movement of one or both punches 13 and 13' towards each other in a press apparatus. At the same time, electric current is supplied from one electrical connector, such as upper connector 41 to upper conducting ring 40 to the punch assembly 11. Referring then to FIG. 2, current flows from punch 13 to ring 39 and disc 36. From this point, current either flows through a suitable heater provided in the vessel or through the specimen itself. The current path continues from lower disc 36', ring 39' to punch 13'. Referring again to FIG. 1, the current path continues through punch assembly 11', conductor ring 40' and connector 41' to the electrical source (not shown).

The numerical values for the different pressures as hereinafter given were obtained by calibration as indicated in the aforementioned Hall patent, 2,941,248. Calibration was based upon known electrical resistance changes of certain metals, for example thallium, cesium, barium and bismuth under given pressures. The values for these phase or transition pressures were determined by P. W. Bridgman, "Proceedings of the American Academy of Arts and Sciences," vol. 81, IV, pages 165–221, March 1952. It is obvious that pressure determination may be accomplished by other methods and apparatus. Any differences in numerical pressure values are immaterial since the conditions as established by calibration in a pressure apparatus are the same whether, for example, a pressure gage indicates a given pressure for one calibration method or another pressure for a different calibration method. As a specific example, a barium transition of 77,500 atmospheres by applicants' calibration or the same barium transition at 59,000 atmospheres by another calibration method indicates the same conditions in the reaction vessel.

The following is one example of a transformation of carbonaceous material to diamond as carried on in an apparatus similar to that of FIG. 1.

EXAMPLE 1

The reaction vessel of FIG. 2 was assembled employing alternate small solid cylinders of commercially obtained graphite of spectroscopic purity and nickel, 99.6% nickel. The vessel was subjected to a pressure of about 90,000 atmospheres together with a temperature of about 1600° C. These conditions were maintained for about 3 minutes. After removal from the apparatus the reaction vessel was found to contain diamonds.

Thousands of carats of diamonds have been produced by this apparatus and similar examples with pressures ranging as low as about 50,000 atmospheres and temperatures as low as about 1200° C. The color of these diamonds have been found to be black, water white or ranging from dark green to light yellow. They have not been found to be electrically conductive or semiconductive because any electrical conductance present appears to be through the impurities alone.

When the process as described in Example 1 is employed and where, in addition to graphite and nickel, a small amount of activator material is placed within the reaction vessel and subjected to the required pressures and temperatures, diamonds are grown which were discovered to be electrically conductive and semiconductive. Examples of such activator materials are boron, aluminum, beryllium, and/or compounds of these materials which will decompose or otherwise react to provide the elements or their carbides. It is of particular note that addition of boron provides diamonds ranging from light blue to deep purple and that those natural diamonds indicated to be able to conduct electricity in the restricted sense of the word have also been of a light blue color.

It is an important feature that atoms of these activator elements will enter the diamond crystal lattice during the growth or formation of diamond from a carbonaceous material and, therefore, any process which effects such growth is applicable. As applied to this invention such a process requires no specific pressure and temperatures other than those indicated for diamond growth conditions. For example, pressures ranging upwardly from about 50,000 atmospheres and temperatures ranging upwardly from about 1200° C. may be employed depending on the particular catalyst used. Catalysts previously employed include metals, alloys, or metals containing those metals, of the metals of Group VIII of the Periodic Table of Elements, chromium, manganese and tantalum, and also compounds which react or decompose to provide these metals.

Graphite is generally preferred as a starting carbonaceous material because of its purity, uniformity, and ease of conversion. However, it should be understood that various carbonaceous materials in addition to graphite may be employed, for example, amorphous carbon, coal, coke, charcoal, etc. The invention is also applicable to carbon containing compounds, inorganic or organic, of which examples include unrelated materials such as coal, tar, pitch, wood, paper, lithium carbide, naphthalene, etc. It should be understood that the starting material which is a carbonaceous material may also be diamond. Diamond has been employed in various processes where the diamond is converted to graphite or employed as a seed.

The activator material may be employed as a powder, or solids such as discs, cylinders and any other geometrical or irregular shape, in elemental or compound form. For example, boron may be employed by way of compounds which include $B_4C$, $B_2O_3$, $BN$, $NaB_4O_7$, $B_{10}H_{14}$, $NiB$ and $LiBH_4$, etc. Aluminum may also be employed in metallic or non-metallic forms or compounds, for example $Al_4C_3$. Compounds of beryllium that may be employed include $BeS$, $Be_3N_2$ and $Be_2C$. With respect to the carbon-catalyst-activator combination, various arrangements may be employed with no marked differences in the final result. Several arrangements are set forth in the examples. It appears that insofar as diamond growth is concerned, the addition of the activator generally will provide an electrically conductive diamond which is not electrically conductive through inclusions alone.

The amount of boron is not critical since significant additions thereof of less than about 0.1% to 20% by weight of graphite and greater provide electrically conductive diamond in all instances. Aluminum has been added in the range of less than 0.5% to more than 25% by weight of graphite. In general, an increase in added boron provides not only a more conductive diamond but also diamonds of a deeper color, i.e., from lighter shades of blue to deep purple. An increase in the amount of aluminum also results in increased conductivity and whiter or more colorless diamonds. Beryllium has been added in the general range of less than about 10% to more than 30% by weight of graphite. Diamonds grown in the presence of beryllium are more colorless than diamonds grown with no beryllium present. It is reiterated that the amount of activator material employed is not critical since the smallest significant quantity introduced into a diamond crystal will provide a change in the electrical conductivity thereof. By the same token a significant rather than a trace number of foreign atoms are present in the diamond crystal. These atoms are present in discrete form and not as foreign atoms contained in, for example, iron, which is then contained in the diamond crystal.

Specific results of the practice of this invention are given in the following examples as applied to diamond growth processes.

EXAMPLE 2

The reaction vessel of FIG. 2 was assembled utilizing nickel as a catalyst and spectroscopic purity graphite as the carbonaceous material. The nickel and graphite were in the form of thin discs 0.020 and 0.1 inch thick, respectively and stacked within tube 55 in alternate form, 15 catalyst discs and 14 graphite discs. Boron powder in the ratio of about 1 part by weight boron to 500 parts by weight graphite was positioned at the interfaces between the nickel and graphite discs. The reaction vessel was subjected to 78,000 atmospheres pressure and 1450° C. temperature for a period of about 60 minutes. Diamonds recovered from the reaction vessel were blue and electrically conductive.

EXAMPLE 3

The arrangement as described for Example 2 was employed. The catalyst disc was an alloy of 5% titanium, 65% iron and 30% nickel. Boron powder was dusted on the interfaces of the catalyst-graphite discs. The reaction vessel was subjected to 66,000 atmospheres pressure and 1220° C. temperature for about 90 minutes. Diamonds recovered were blue and electrically conductive.

EXAMPLE 4

The arrangement as described for Example 2 was employed with the exception that the catalyst was low carbon steel. Boron powder was dusted on the interfaces between the catalyst and graphite. The reaction vessel was subjected to 76,000 atmospheres pressure and 1420° C. temperature for about 10 minutes. Diamonds recovered were blue and electrically conductive.

EXAMPLE 5

The arrangement as described for Example 2 was used. The catalyst discs were tantalum. A powder mixture of iron and boron (2% by weight of boron to iron) was dusted on the interfaces between the tantalum and the graphite. The assembly was subjected to 76,000 atmospheres pressure and 1420° C. temperature for about 10 minutes. Diamonds recovered were blue and electrically conductive.

In the following examples, the reaction vessel of FIG. 3 was employed. In FIG. 3, reaction vessel 50 comprises in one example a pyrophyllite cylinder 51 of about 5/32 inch wall thickness and 3/4 inch outside diameter. Placed concentrically within the cylinder 51 is heating tube 52 of graphite, about 0.44 inch O.D. which lies adjacent to and contiguous with cylinder 51. A further cylinder 53 of alumina of about 0.365 inch O.D. is placed within heater tube 52 to be adjacent thereto. Graphite 54 from which diamonds are grown is then placed in a diamond metal catalyst tube 55 of about 0.020 inch wall thickness which is then positioned centrally within cylinder 53. For other applications, graphite 54 may be other reactants and tube 55 other catalysts. A plug of alumina 56 and 56' (not shown) fits with the upper and lower portions of graphite heater tube 52 to maintain the graphite and catalyst in the same manner as the sides of vessel 50. Suitable end discs 57 and 57' are provided to convey current to heater tube 52. Alumina cylinder 53 should be of the pre-fired variety so that it is relatively soft.

This type of reaction vessel provides heating of the specimen indirectly, i.e., the current flows through the graphite tube instead of the specimen. The specimen is also well insulated from cylinder 31 and the punches. This type of reaction vessel is described and claimed in copending application Serial No. 855,787, now U.S. Patent 3,031,269, Bovenkerk, filed November 27, 1959, and assigned to the same assignee as the present application and incorporated herewith.

EXAMPLE 6

In the aperture of the reaction vessel illustrated in FIG. 3, there was positioned a nickel tube, as a catalyst, containing a 2-gram cylinder of graphite of spectroscopic purity. About 1 mg. of boron powder was dusted on the outside of the graphite cylinder before insertion into the nickel tube. The assembly was then positioned in the press apparatus of FIG. 1 and subjected to about 75,000 atmospheres pressure and about 1450° C. After remaining at these conditions for a few minutes, the temperature and pressure were reduced and diamonds were recovered from the reaction vessel of a blue color. These diamonds showed great electrical conductivity.

EXAMPLE 7

The conditions of Example 6 were repeated but with about 1 mg. of boron powder dusted on the outside of the nickel tube. The diamonds removed from the reaction vessel were blue and electrically conductive.

EXAMPLE 8

The reaction vessel of FIG. 3 was assembled employing a tube 55 of Invar (nickel-iron alloy) and containing a cylinder of spectroscopic purity graphite. About 1 mg. boron powder was dusted on the outside of tube 55. The reaction vessel was subjected to 66,000 atmospheres and 1250° C. temperature for about 60 minutes. Diamonds recovered from this reaction vessel were blue and electrically conductive.

EXAMPLE 9

The reaction vessel of FIG. 3 was assembled by coating the inside of Invar tube 55 with about 1 mg. of $B_4C$ powder (600 mesh). The tube was then filled with powdered graphite of spectroscopic purity. The reaction vessel was subjected to 70,000 atmospheres and 1280° C. temperature for about 45 minutes. Diamonds recovered were blue and electrically conductive.

EXAMPLE 10

The reaction vessel of FIG. 3 was assembled with $B_4C$ mixed with graphite powder (5% $B_4C$ by weight of graphite) in Invar tube 55. The reaction vessel was subjected to 70,000 atmospheres pressure and 1250° C. temperature for about 40 minutes. Diamonds recovered from the reaction vessel were blue and electrically conductive.

EXAMPLE 11

The reaction vessel of FIG. 3 was assembled with an Invar tube 55 and a graphite cylinder 54 of spectroscopic purity. 2.9% of boron (by weight of graphite) was impregnated in cylinder 54 by mechanical mixing in the graphite preparation. The assembly was subjected to 64,000 atmospheres and 1240° C. temperature for about 30 minutes. Diamonds recovered from the reaction vessel were blue and electrically conductive.

EXAMPLE 12

Five grams of borax (sodium perborate) were dissolved in 500 ml. of water. A graphite cylinder 54 was placed in the solution, the combination heated, the cylinder removed and dried. The graphite cylinder was placed in Invar tube 55. The reaction vessel was subjected to 68,000 atmospheres pressure and 1250° C. temperature for about 60 minutes. Diamonds recovered were blue and electrically conductive.

EXAMPLE 13

A nickel tube 55 of FIG. 3 was filled with a mixture of boron, and graphite powder of spectroscopic purity. Boron powder size was 325 mesh and 2% by weight of graphite. The reaction vessel was subjected to 78,000 atmospheres pressure and 1500° C. temperature for about 30 minutes. Diamonds were blue and electrically conductive.

The following are examples of conductive diamond obtained by the use of aluminum with the respective reaction vessel configuration as set forth.

EXAMPLE 14

The tube 55 of FIG. 3 was of commercially pure iron exceeding 99.5% iron. This tube had an outside diameter of .308 inch and .015 inch wall thickness. A graphite rod of spectroscopic purity was wrapped with commercial grade aluminum foil of about .001 inch thickness to about five layers. The aluminum wrapped graphite was placed within the iron tube and the assembly positioned in the reaction vessel. The vessel was subjected to about 68,000 atmospheres pressure and 1350° C. temperature. Diamonds recovered were lighter in color shade than those produced with iron alone, and electrically conductive with a resistivity in the range of $2 \times 10^4$ to $40 \times 10^4$ ohm-cm. at 25° C.

EXAMPLE 15

The tube 55 of FIG. 3 was of commercially pure iron exceeding 99.5% iron. This tube had an outside diameter of about .308 inch and .015 inch wall thickness. The graphite rod of spectroscopic purity was wrapped with commercial grade of aluminum foil of about .001 inch thickness in one layer. The aluminum wrapped graphite was placed within the iron tube and the assembly positioned into the reaction vessel. The vessel was subjected to about 75,000 atmospheres and 1450° C. Diamonds recovered were light colored as in Example 14 and electrically conductive.

EXAMPLE 16

In the reaction vessel of FIG. 2, there was assembled approximately 14 graphite discs of spectroscopic purity graphite of about 0.1 inch thick together with 15 catalyst discs of commercially pure iron about .020 inch thick. The graphite and iron discs were assembled in stacked relationship with a disc of commercial aluminum foil of .001 inch thickness between each graphite disc and its associated catalyst disc. The apparatus was then subjected to about 1450° C. and 75,000 atmospheres. Diamonds recovered were found to be of a light color and electrically conductive. Example 16 is representative of numerous operations, producing diamonds conductive because of aluminum, in the general range of 1400–1500° C. and 75,000–80,000 atmospheres.

EXAMPLE 17

In the reaction vessel of FIG. 2, there was placed in alternate stacked relationship graphite discs of spectroscopic purity together with an iron aluminum alloy containing 8% aluminum, by weight, to iron. Disc thicknesses were the same as those in Example 16. The assembly was subjected to about 1500° C. and 80,000 atmospheres. Diamonds recovered were of a light color and electrically conductive.

EXAMPLE 18

In the reaction vessel of FIG. 3, the tube 55 was of commercially pure nickel. A thin wall, commercially pure aluminum tube, was placed within the nickel tube and comprised about 3%, by weight, of the nickel. Within the aluminum tube there was placed a graphite rod of spectroscopic purity graphite. The assembly was then subjected to approximately 1450° C. and 77,000 atmospheres. Diamonds recovered were electrically conductive and lighter in color than diamonds grown with nickel only.

The following examples are indicative of the use of beryllium and a beryllium compound.

EXAMPLE 19

The reaction vessel was of the type illustrated in FIG. 2. The cylinder 35 as employed was about 0.125 inch diameter and 0.450 inch long. A thin walled commercially pure nickel tube containing a fine powder mixture of beryllium and spectroscopically pure graphite was placed in cylinder 35. The ratio of beryllium to graphite was ¼ to ¾ by weight. The reaction vessel was subjected to a pressure of about 85,000 atmospheres and a temperature of about 1500° C. for about 6 minutes. Diamonds recovered from the reaction vessel were about 0.2 mm. in size, colorless, and electrically conductive. Their resistivity at 25° C. was about $6 \times 10^5$ ohm-cm. At about 250° C. their resistivity was about $2 \times 10^4$ ohm-cm.

EXAMPLE 20

The apparatus and procedure of Example 19 were repeated, except that a pressure of 80,000 atmospheres was employed with a time of 4 minutes. Diamonds recovered were about 0.2 mm. in size and had electrical resistivities of about $4 \times 10^3$ ohm-cm. at 25° C.

EXAMPLE 21

The apparatus and procedure of Example 19 were repeated, except that a powdered mixture of BeS 10%, by weight, iron 25%, by weight, and spectrocopically pure graphite 65%, by weight, was placed in a thin wall commercially pure nickel tube. After exposure to about 80,000 atmospheres pressure and 1500° C. temperature for about 5 minutes, the reaction vessel content was removed from the press and treated with nitric, sulfuric and hydrochloric acids for cleaning. Diamond crystals recovered were about 0.15 mm. in size and p-type semiconductors with a resistivity of about $6 \times 10^4$ ohm-cm. at 25° C. and $3 \times 10^4$ ohm-cm. at 60° C.

EXAMPLE 22

The procedure and apparatus of Example 21 were repeated, except that $Be_3N_2$ was employed instead of BeS. The resulting diamonds were about 0.25 mm. in size. They were found to be p-type semiconductors having resistivities in the range of $2 \times 10^4$ to $2 \times 10^5$ ohm-cm. at 25° C.

In the foregoing examples, all materials utilized were known materials with known impurity content. This applies not only to the graphite catalyst metal and activator employed, but also to reaction vessel materials, and in effect to all materials which would ordinarily be involved. Thus, for example, diamonds are grown or have been grown under a given set of conditions with given materials and the diamonds recovered are neither blue in color nor electrically conductive. These results are known for literally hundreds of operations. Accordingly, a repeat operation utilizing the addition of high purity boron, for example, results in blue and electrically conductive diamonds. High purity boron may contain very small amounts of impurities, as determined by spectrographic and X-ray analysis, such as carbon, sulfur, silicon, tantalum, nitrogen, oxygen, hydrogen, iron, aluminum, calcium, magnesium, copper, manganese, zirconium and sodium. Many of these elements are present in only very small trace amounts, and not all are present in boron prepared by different processes. The major impurities in high purity boron of 99.8%+ boron, are carbon, silicon, iron and sodium. In any event, many of these elements are present in natural and man-produced diamonds which are neither blue nor electrically conductive. Furthermore, many of these materials are present in surrounding and contiguous objects in a diamond growth reaction and the diamonds obtained are neither blue nor electrically conductive. In addition, diamonds have been grown by direct addition of these impurities with no blue or electrically conducting diamond resulting. The evident conclusion is that in view of these results taken in connection with the p-type crystals as hereinafter described, boron is the activator material. The results are similarly true with respect to beryllium and aluminum.

"Electrically conductive" as employed, is intended to mean conductive other than through included impurities such as catalyst metal, etc. For example, in a cubic crystal, a poor quality diamond may have metal impurities extending or interconnecting from one face to an opposite face, and when these faces are placed between electrical probes, current conduction can take place through the metal inclusion alone. Conduction may also take place because of surface impurity conduction. These and other related methods of conducting have been excluded and conduction has been found to be through conduction carrier mobility of the crystal structure.

More specifically, the diamonds of each example were carefully screened for those of exceptional clarity and form with no apparent impurities and no impurities under 30× magnification, indicating extensive inclusions between faces. Thereafter, these diamonds were treated with a hot concentrated sulfuric acid and potassium nitrate solution to dissolve any surface impurities and to leach out any inclusions having a surface contact. Aqua regia was also employed in the cleaning process.

The processed diamonds were then placed between conductors of a volt-ohm-milliampere meter for resistivity measurement. Several measurements were made to include different faces of each crystal and only minor changes in resistivity were noted for the same crystal. The general range of resistivity was found to be as low as $10^3$ ohm-cm. and generally about $10^4$ to $10^7$ ohm-centimeters for boron-doped diamonds and from about $2 \times 10^4$ to $2.10^7$ ohm-centimeters for aluminum-doped diamonds at room temperature. Typical variations of resistance with temperature for such diamonds are given in the accompanying table.

*Table*

ELECTRICAL RESISTANCE VS. TEMPERATURE FOR ELECTRICALLY CONDUCTING DIAMONDS

| Temperature, ° C. | Relative Resistance | |
|---|---|---|
| | Boron-doped | Aluminum-doped |
| 25 | 1 | 1 |
| 50 | 0.3 | $1.5 \times 10^{-1}$ |
| 420 | $3 \times 10^{-2}$ | $1.5 \times 10^{-3}$ |
| −210 | $2 \times 10^2$ | $3 \times 10^2$ |

Several semiconductive tests were performed on the selected and clean diamond crystals as follows. A single crystal was placed within a small diameter Pyrex tube and a silver wire probe inserted in each end of the tube adjacent the crystal. The silver probes were connected to a volt-ohm-milliampere meter so that the resistance of the crystal could be measured. The tube apparatus was placed in liquid nitrogen for low temperatures. After temperature stabilization, the apparatus was then heated in a furnace to a maximum temperature of about 450° C. In all instances, electrical resistance decreased with a rise in temperature, and ranged from $100.10^6$ ohm at liquid nitrogen temperature to about 200 ohms at 450° C.

Semiconductivity was also ascertained by the thermoelectric power method as follows. If a nickel catalyst were employed in the growth process it may be assumed that conductivity may take place through nickel inclusion. A diamond crystal (cleaned as described) was placed adjacent a silver electrode to provide a thermocouple junction. If conductivity takes place through nickel then the nickel-silver thermocouple voltage characteristics should be present. In the instance as described the observed thermocouple voltage characteristics was not that of nickel-silver. This test was repeated several times and for various diamond crystals with each instance indicating voltage characteristics different from the assumed metals or graphite.

The electrically conductive diamonds of the above examples were discovered to be similar in nature to that of p-type semiconductors. This was established by the sign of their thermoelectric power, that is, by the direction of the voltage gradient developed in them when they were placed in a temperature gradient. Between silver metal probes, the boron-doped diamonds showed typical thermoelectric powers of about 10 to 100 microvolts/° C., and the aluminum-doped diamonds showed thermoelectric powers of 20 to 80 microvolts/° C., at average temperatures of about 200° C.

One description of a semiconductor is a material having a negative temperature coefficient of resistance. The coefficient is positive in some temperature ranges, negative in others. This temperature behavior of resistance is in contrast with that of metals. Generally speaking, semiconductors are electronic conductors. Electric current may be carried, however, by two types of charged particles. First, is the electron, a negatively charged particle of charge $4.80 \times 10^{-10}$ esu., and a mass of $9.11 \times 10^{-28}$ g. Semiconductors in which the electrons do the charge carrying are generally called the n-type or excess semiconductors. Those semiconductors which conduct by the agency of the electron vacancy or "positive hole" are referred to as the p-type or defect semiconductors. The absence of a negative electron or electron vacancy is the alternate terminology to describe the term "positive hole." The motion of the hole carries a positive charge, because the region was electrically neutral before the electron was removed. The vacancy moves in the proper direction for a positive particle, however, only because of the negative mass characteristics of the electrons in the energy neighborhood.

The crystal lattice of diamond is generally referred to as the "diamond cubic form" which is the same structure taken by silicon and germanium. The basic bond pattern is a tetrahedral bond wherein each atom has four nearest neighbors bound to it by valence binding forces. The diamond cubic lattice is an example of an open as distinguished from a closed packed structure. The distance between the centers of nearest neighboring atoms of a diamond cubic crystal is 1.54 Angstroms. It is assumed, therefore, that since, for example, a boron atom is only slightly larger than this dimension that the diamond crystal lattice accepts a boron atom. The boron atom then becomes an impurity or foreign atom in the crystal lattice in the same manner as foreign atoms are included in semiconductors. Impurities may be interstitial or substitutional. In the first instance, the atoms are wedged between lattice atoms, while in the second, they replace lattice atoms. The boron atom, containing three electrons, competes with surrounding carbon atoms to have a fourth electron for a total of 8 as a well-known filled shell. The competition results in a hole and thus a p-type crystal.

While the crystal structure of diamond accepts a boron, beryllium, or aluminum atom, one reason being that atom size and crystal spacings are not too dissimilar, it is obvious that other materials may be so employed. Specifically, the remaining elements of group III of the Periodic Table of Elements may be so employed and gallium and indium are well known acceptor elements in the semiconductor art. Nitrogen may be used since some nitrogen is already present in natural diamonds. Phosphorous is yet another example.

It is noted that the diamonds doped with boron by this process range from a light blue to a deep purple, a color which is comparable to the color of natural electrically conductive diamond. It is also noted that when various other materials are added to the diamond growing process, and which are considered to be impurities in the crystal structure, these diamonds range in the green and yellow colors. It is, therefore, believed that boron atoms entering the carbon lattice work enter therein as atoms within the crystal framework rather than simple inclusions and that, therefore, the diamond is conductive through the crystal structure rather than through added inclusions. By the same token, the characteristic blue color is obtained through a change in the crystal structure or electronic structure. Another way of describing the foreign atoms of this invention in a diamond crystal is that the foreign atoms enter as discrete atoms which modify the electrical properties of the crystal, and not as inclusions which carry their own electrical properties in. All reference to a diamond containing a foreign atom is intended to describe substitutional or interstitial atoms only and not inclusions as described or foreign atoms contained in inclusions.

A comparison may be made of the diamonds of this invention to other diamonds both man-produced and natural. For example, the resistivity of a non-conducting natural diamond is about $10^{10}$ ohm-cm. and of man-produced diamonds about $10^8$–$10^{10}$ ohm-cm. The diamonds of this invention have resistivities of as low as $10^3$ ohm-cm. The term "man-produced diamond" is employed as a descriptive term in one sense because diamonds may be grown to have inclusions of various materials or elements therein which are not present or found to be present in natural diamonds.

The process is applicable to the production of colored diamonds where blue diamonds are desired ranging from the very light blues to the deep purples, and thus the invention becomes also a process for coloring diamonds. It has been described that, ordinarily, diamonds grown with the described catalysts may vary in colors of brown, green, yellow, white and black and various shades thereof depending on temperatures and pressures employed. At high pressures and temperatures diamonds grown become more clear or white and boron addition may provide diamonds ranging from light blue to deep purple. Generally, at lower pressures and temperatures colors may be obtained which are combinations of blue and the aforementioned colors and single crystals may be partly blue and partly green and other combinations. By the same token, aluminum may be employed to provide white or whiter diamonds and to vary the color shades. Addition of aluminum or beryllium or aluminum or beryllium compounds to the diamond growing process or as alloys to the catalyst material provides whiter or lighter shade colors.

It is also obvious that diamond may be grown on a seed crystal so that a conductive diamond or layer of conductive diamond may be grown on a nonconductive seed.

While other modifications of this invention and variations that may be employed within the scope of the invention have not been described, the invention is intended to include all such as may be embraced within the following claims.

What we claim as new and desire to secure by Letters Patent of the United States is:

1. A method for introducing boron atoms into a diamond crystal lattice during formation thereof comprising the steps of:
    (a) preparing a specimen for the conversion of non-diamond carbonaceous material to diamond at elevated temperatures and pressures,
        (1) said specimen containing a quantity of a substance from which at elevated pressures and temperatures boron atoms are released,
        (2) said quantity being an amount by weight between about 0.1 percent and about 20 percent of the weight of non-diamond carbonaceous material,
    (b) submitting said specimen to the simultaneous application of a pressure of at least 50,000 atmospheres and a temperature of at least 1200° C. to transform the non-diamond carbonaceous material to diamond, and
    (c) recovering from said specimen a diamond having integrally-contained boron atoms.

2. The method as substantially as recited in claim 1 wherein the activator material is boron.

3. A method for introducing boron atoms into a diamond crystal lattice during formation thereof comprising the steps of:
    (a) preparing a specimen comprising a quantity of non-diamond carbonaceous material and a quantity of an activator material,
        (1) said activator material consisting of at least one substance chosen from the class consisting of B, $B_4C$, $B_2O_3$, BN, $NaB_4O_7$, $B_{10}H_{14}$, NiB and $LiBH_4$,
    (b) subjecting said specimen to a temperature of at least 1200° C. and a pressure of at least 50,000 atmospheres to effect conversion of the non-diamond carbonaceous material to diamond,
    (1) said activator material being present in an amount by weight between about 0.1 percent and about 20 percent of the weight of non-diamond carbonaceous material, and
(c) recovering from said specimen a diamond crystal having integrally-contained discrete boron atoms.

4. The method as substantially as recited in claim 3 wherein the activator material is boron.

5. The method as substantially as recited in claim 3 wherein the activator material is boron carbide.

References Cited in the file of this patent
UNITED STATES PATENTS 2,947,609   Strong _____ Aug. 2, 1960

OTHER REFERENCES

Smith: Semiconductors, pub. by Syndics of the Cambridge University Press, New York, pages 378–380, paragraphs 10.2 and 10.2.1.